(12) United States Patent
Toyama

(10) Patent No.: US 11,953,396 B2
(45) Date of Patent: Apr. 9, 2024

(54) ROTATION ANGLE DETECTION DEVICE

(71) Applicant: JTEKT CORPORATION, Osaka (JP)

(72) Inventor: Yuichi Toyama, Owariasahi (JP)

(73) Assignee: JTEKT CORPORATION, Osaka (JP)

( * ) Notice: Subject to any disclaimer, the term of this patent is extended or adjusted under 35 U.S.C. 154(b) by 157 days.

(21) Appl. No.: 17/149,282

(22) Filed: Jan. 14, 2021

(65) Prior Publication Data

US 2021/0223126 A1 Jul. 22, 2021

(30) Foreign Application Priority Data

Jan. 16, 2020 (JP) .................................. 2020-005283

(51) Int. Cl.
*G01L 3/10* (2006.01)
*B62D 6/10* (2006.01)
(Continued)

(52) U.S. Cl.
CPC ................ *G01L 3/105* (2013.01); *B62D 6/10* (2013.01); *B62D 15/0215* (2013.01); *G01D 5/145* (2013.01); *G01D 5/2449* (2013.01); *G01D 5/2452* (2013.01); *G01L 3/104* (2013.01); *G01L 5/221* (2013.01); *G01D 2205/26* (2021.05); *G01D 2205/28* (2021.05)

(58) Field of Classification Search
CPC ......... G01L 3/105; G01L 3/104; G01L 5/221; G01D 5/145; G01D 5/2449; G01D 5/2452; G01D 2205/26; G01D 2205/28; B62D 15/0215; B62D 6/10; G01B 7/30
See application file for complete search history.

(56) References Cited

U.S. PATENT DOCUMENTS 10,252,745 B2   4/2019 Nampei
2007/0103147 A1* 5/2007 Kondo ............... B62D 15/0215
                                                324/207.25
(Continued)

FOREIGN PATENT DOCUMENTS

CN       107830154 B      8/2019
EP       1477389 A2 *    11/2004    ......... B62D 15/0215
(Continued)

OTHER PUBLICATIONS

Jun. 2, 2021 extended Search Report issued in European Patent Application No. 21151390.8.

*Primary Examiner* — Farhana A Hoque
*Assistant Examiner* — Joseph O Nyamogo
(74) *Attorney, Agent, or Firm* — Oliff PLC

(57) ABSTRACT

A rotation angle detection device includes a correction-object driven gear that is a driven gear meshing with a main driving gear, a first sensor that is configured to generate an electrical signal based on rotation of the correction-object driven gear, and an electronic control unit that computes a driven-side rotation angle based on the electrical signal. The electronic control unit is configured to store a correction angle used to correct the driven-side rotation angle when computing the driven-side rotation angle. The correction angle is a predetermined deviation in a predetermined angle domain obtained as an average value in which deviations of the number equal to the integer and corresponding to a same relative rotation angle is averaged, so as to be deviation in an angle domain of 0 to 360 degrees.

4 Claims, 6 Drawing Sheets

(51) Int. Cl.
  *B62D 15/02*    (2006.01)
  *G01B 7/30*     (2006.01)
  *G01D 5/14*     (2006.01)
  *G01D 5/244*    (2006.01)
  *G01D 5/245*    (2006.01)
  *G01L 5/22*     (2006.01)

(56) References Cited

U.S. PATENT DOCUMENTS

2009/0105909 A1      4/2009   Yamaguchi
2010/0224011 A1 *    9/2010   Klimenko ............. G01L 3/1471
                                                          73/862.326
2015/0108878 A1      4/2015   Rodger et al.

FOREIGN PATENT DOCUMENTS

EP          1892498 A1 *   2/2008    ......... B62D 15/0215
JP        2006-029937 A    2/2006

* cited by examiner

ROTATION ANGLE DETECTION DEVICE

CROSS-REFERENCE TO RELATED APPLICATION

This application claims priority to Japanese Patent Application No. 2020-005283 filed on Jan. 16, 2020, incorporated herein by reference in its entirety.

BACKGROUND

1. Technical Field

The disclosure relates to a rotation angle detection device.

2. Description of Related Art

Japanese Unexamined Patent Application Publication No. 2006-29937 (JP 2006-29937 A) discloses a rotation angle detection device that detects a rotation angle of a rotation shaft. The rotation angle detection device described in JP 2006-29937 A has a first gear serving as a main driving gear that rotates integrally with the rotation shaft, a second gear serving as a driven gear that meshes with the first gear, and a third gear serving as a driven gear that meshes with the second gear. The numbers of teeth of the two driven gears are set to be smaller than the number of teeth of the main driving gear. The numbers of teeth of the two driven gears are also different from each other, and the two driven gears are arranged such that the rotation angles of the two driven gears are different from each other when the main driving gear rotates. A computing unit detects the rotation angles of the driven gears from sensors provided corresponding to each of the two driven gears, and computes the rotation angle of the main driving gear, i.e., the rotation angle of the rotation shaft, based on these detected rotation angles.

The computation precision of the rotation angle of the main driving gear deteriorates due to electrical error of sensor output and mechanical error of the gears. In the rotation angle detection device described in JP 2006-29937 A stores deviation between the actual rotation angle of the main driving gear and the computed rotation angle of the main driving gear occurring due to such error as a correction angle, and corrects the rotation angle of the main driving gear using this correction angle when computing the rotation angle of the main driving gear.

SUMMARY

Some computing units that compute the rotation angle of a driven gear have a function imparted thereto to correct the rotation angle of the driven gear detected in an angle domain of 0 to 360 degrees. These computing units obtain deviation in the angle domain of 0 to 360 degrees, and store the deviation as the correction angle. However, in an angle domain exceeding 360 degrees, in which the driven gear rotates by more than one rotation, raising the detection precision of the rotation angle of the driven gear by correcting the rotation angle of the driven gear using the stored correction angle is difficult. For example, the computing unit performs correction of the rotation angle of the driven gear using the same correction angle for a certain rotation angle of the driven gear that is 180 degrees, and for 540 degrees that is a rotation angle in which the driven gear is further rotated by one rotation from this rotation angle, which is the same 180 degrees in relative terms. However, even though the relative rotation angle of the driven gear is the same 180 degrees between the first rotation and the second rotation, the positions of the main driving gear and the driven gear meshing differ, and accordingly sometimes the rotation angle of the driven gear should be corrected by different correction angles for the first rotation and the second rotation. In this case, correcting the rotation angle of the driven gear using the stored correction angle may result in the divergence between the rotation angle of the driven gear following correction and the actual rotation angle of the driven gear being greater than the divergence between the rotation angle of the driven gear prior to correction and the actual rotation angle of the driven gear, and the detection precision of the rotation angle of the driven gear may deteriorate. Accordingly, there is demand for a rotation angle detection device that can appropriately correct the rotation angle of the driven gear being detected, and raise the detection precision of the rotation angle of the driven gear.

An aspect of the disclosure is a rotation angle detection device. The rotation angle detection device includes a correction-object driven gear that is a driven gear meshing with a main driving gear that is provided to a rotation shaft so as to be integrally rotatable with the rotation shaft, a first sensor that is configured to generate an electrical signal based on rotation of the correction-object driven gear, and an electronic control unit that is configured to compute a driven-side rotation angle, which is a rotation angle of the correction-object driven gear, based on the electrical signal generated by the first sensor. The number of teeth of the correction-object driven gear is the number of teeth obtained by dividing the number of teeth of the main driving gear by an integer. The electronic control unit is configured to store a correction angle used to correct the driven-side rotation angle when computing the driven-side rotation angle. The correction angle is a predetermined deviation in a predetermined angle domain obtained as an average value in which deviations of a number equal to the integer and corresponding to the same relative rotation angle is averaged, so as to be deviation in an angle domain of 0 to 360 degrees. The predetermined deviation is a deviation obtained in the predetermined angle domain, and is deviation between the driven-side rotation angle and an actual rotation angle of the correction-object driven gear. The driven-side rotation angle is obtained over a full angle domain when the correction-object driven gear is rotated for a number of times equal to the integer.

The correction angle that the electronic control unit stores is an average value in which deviations of the number equal to the integer and corresponding to the same relative rotation angle is averaged. When obtaining the correction angle, the correction angle is obtained taking into consideration not only deviation in an angle domain of 0 to 360 degrees but also deviation in an angle domain exceeding 360 degrees. The driven-side rotation angle is corrected based on the correction angle obtained taking into consideration deviation in an angle domain exceeding 360 degrees as well, and accordingly the driven-side rotation angle can be corrected more appropriately overall as compared to when correcting the driven-side rotation angle based on a correction angle obtained only from deviation in an angle domain of 0 to 360 degrees. For example, the correction angle when the rotation angle of the driven gear is 540 degrees conventionally is set based on deviation when the rotation angle of the driven gear is 180 degrees, without taking into consideration the deviation when the rotation angle of the driven gear is 540 degrees. On the other hand, according to the above configuration, the correction angle when the rotation angle of the driven gear is 540 degrees takes into consideration the deviation when the rotation angle of the driven gear is 540 degrees, in addition to the deviation when the rotation angle of the driven gear is 180 degrees. Accordingly, the divergence between the driven-side rotation angle following correction and the actual rotation angle of the driven gear can be suppressed from being greater than the divergence between the driven-side rotation angle prior to correction and the actual rotation angle of the driven gear. Accordingly, the driven-side rotation angle can be more appropriately corrected.

The rotation angle detection device may further include a correction-exempt driven gear that is a different driven gear from the correction-object driven gear meshing with the main driving gear, and a second sensor that is configured to generate an electrical signal based on rotation of the correction-exempt driven gear. The numbers of teeth of the correction-object driven gear and the correction-exempt driven gear may be different from each other. The electronic control unit may be configured to compute a rotation angle of the correction-exempt driven gear based on the electrical signal generated by the second sensor, and may be configured not to perform correction of the rotation angle of the correction-exempt driven gear based on the correction angle.

According to the above configuration, providing the correction-exempt driven gear that has a different number of teeth from the correction-object driven gear enables information to be provided for when obtaining the rotation angle and number of rotations of the main driving gear. Such information enables the rotation angle of the main driving gear to be obtained as an absolute angle.

The rotation angle detection device may further include a biasing member, configured to bias the correction-object driven gear toward the main driving gear. According to the above configuration, meshing between the main driving gear and the driven gear can be suitably secured by biasing the driven gear toward the main driving gear. However, in a rotation angle detection device having a biasing member, occurrence of hysteresis at the driven gear is suppressed by biasing the driven gear toward the main driving gear, and accordingly the effects of the state of teeth of the main driving gear on the computation of the driven-side rotation angle tend to be great. When biasing the driven gear toward the main driving gear, divergence may occur in which the driven-side rotation angle prior to correction is greater than the actual rotation angle of the correction-object driven gear in the angle domain of 0 to 360 degrees, and on the other hand, divergence occurring in which the driven-side rotation angle prior to correction is smaller than the actual rotation angle of the correction object driven gear in the angle domain exceeding 360 degrees for example, as compared to when not biasing the driven gear toward the main driving gear. In this case, conventionally, the driven-side rotation angle is corrected based on the correction angle obtained from deviation in the angle domain of 0 to 360 degrees alone, and accordingly the driven-side rotation angle is corrected to suppress the divergence in which the driven-side rotation angle prior to correction is greater than the actual rotation angle of the correction-object driven gear in the angle domain of 0 to 360 degrees. However, the driven-side rotation angle is corrected in the angle domain exceeding 360 degrees using the same correction angle, and accordingly the divergence in which the driven-side rotation angle prior to correction is smaller than the actual rotation angle of the correction-object driven gear is subjected to correction that causes the small divergence to be greater divergence. Rotation angle detection devices provided with a biasing member have such circumstances, and accordingly using a correction angle taking into consideration deviation in the angle domain exceeding 360 degrees as well enables advantageous effects of correcting the driven-side rotation angle more appropriately to be suitably yielded.

The rotation angle detection device may further include a torque sensor configured to detect torque acting on the rotation shaft. According to this configuration, information regarding not only the driven-side rotation angle but also torque acting to the rotation shaft can be provided.

According to the above configuration, the rotation angle of the driven gear to be detected can be more appropriately corrected, and detection precision of the rotation angle of the driven gear can be raised.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
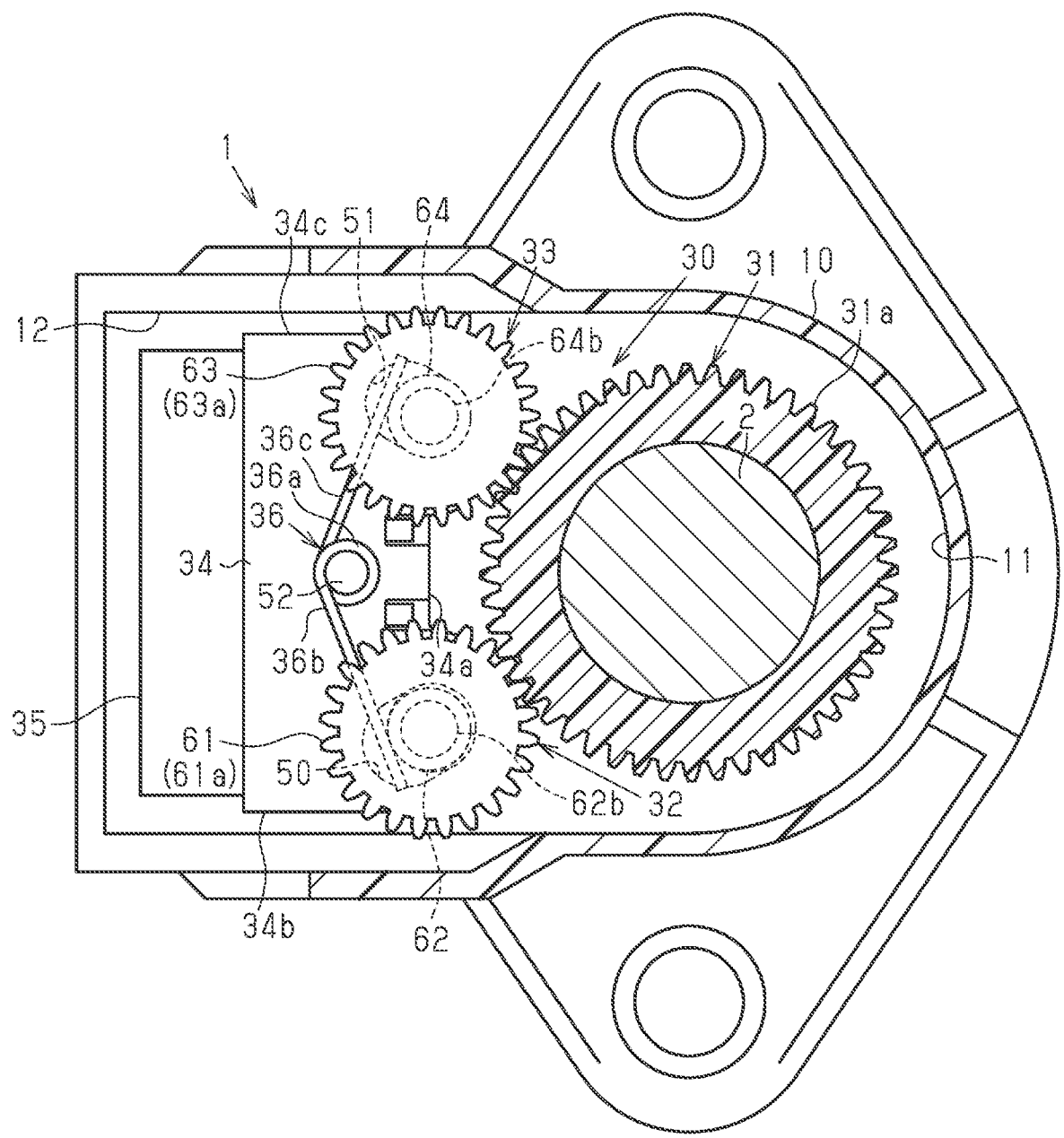
FIG. 1 is a cross-sectional view of a detection device, taken along a plane that includes a line that is orthogonal to a shaft center of a pinion shaft, and that is situated between a supporting member and a cover.
Figure 2:
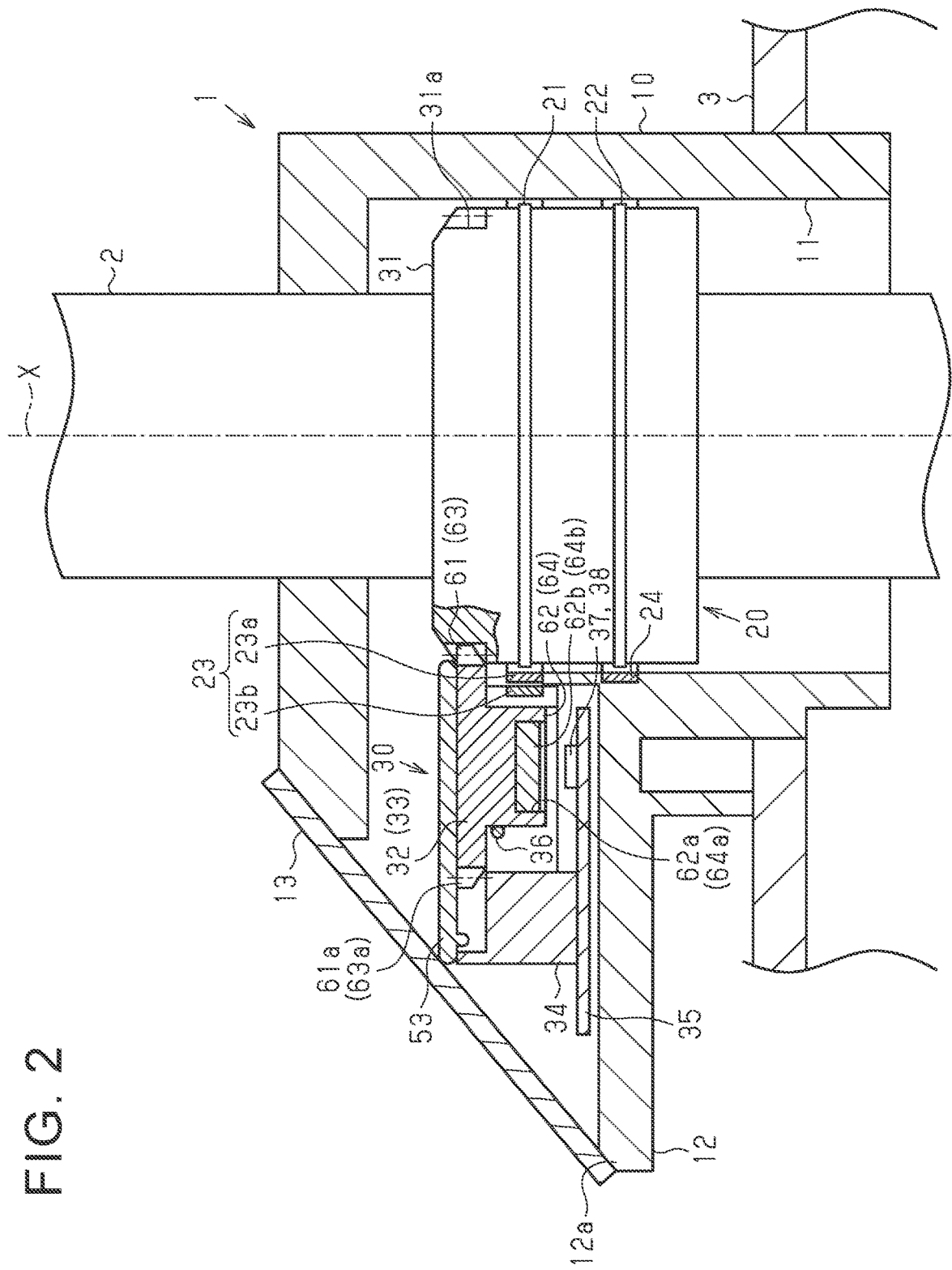
FIG. 2 is a cross-sectional view of the detection device, taken along a plane that includes the shaft center of the pinion shaft, and that includes a line at an intermediate position between a shaft center of a first driven gear and a shaft center of a second driven gear.

An embodiment of a detection device will be described with reference to the drawings. A detection device 1 is installed in a steering device of a vehicle, for example, as illustrated in FIGS. 1 and 2. A pinion shaft 2 serving as a rotation shaft constitutes a steering shaft linked to steering wheels. The detection device 1 is a torque angle sensor device that is a combination of a torque sensor that detects torque applied to the pinion shaft 2 through steering operations of a steering wheel as steering torque, and a rotation angle sensor that detects an absolute angle θpa that is a rotation angle of the pinion shaft 2 over a plurality of rotations exceeding 360 degrees.

The detection device 1 has a sensor housing 10. The sensor housing 10 is attached to a gear housing 3 that accommodates the pinion shaft 2. The sensor housing 10 has an insertion portion 11 and an accommodation portion 12 that communicate with each other. The insertion portion 11 has a cylindrical shape, and the axial line thereof extends in an axial direction X of the pinion shaft 2. The pinion shaft 2 is inserted through the insertion portion 11. The pinion shaft 2 has a steering-wheel-side input shaft, an output shaft at a steered-wheel side, which is the opposite side from the steering wheel, and a torsion bar linking the input shaft and the output shaft. The accommodation portion 12 has a box-like shape, and protrudes from a side face of the insertion portion 11, in a direction intersecting the axial direction X. The accommodation portion 12 is opened in a direction intersecting the axial direction X. An opening portion 12a of the accommodation portion 12 is closed off by a cover 13.

Figure 3:
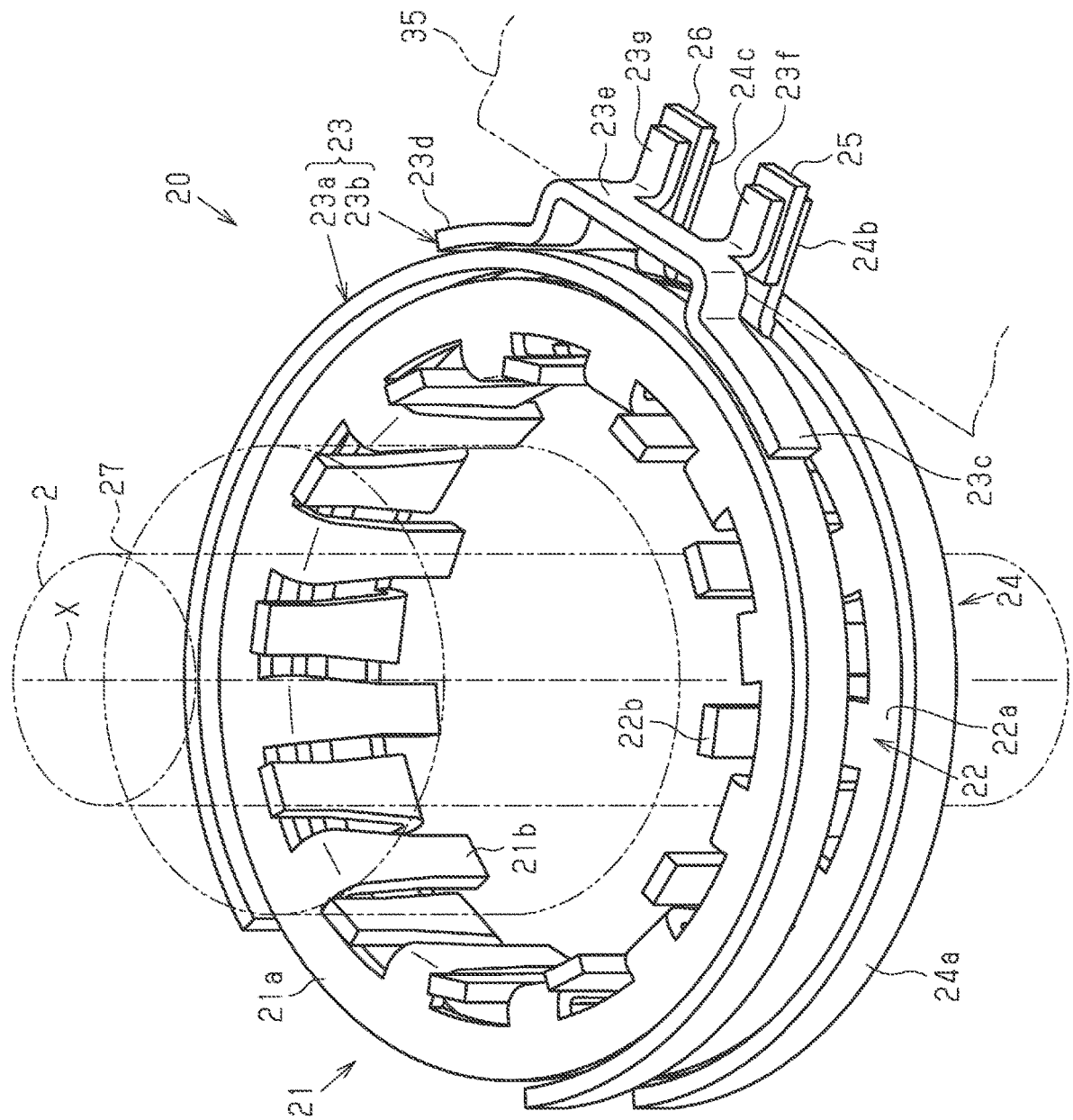
FIG. 3 is a schematic perspective view of a torque sensor.

A torque sensor 20 and a rotation angle sensor 30 are provided inside the sensor housing 10, as illustrated in FIG. 2. The torque sensor 20 has a first magnetic yoke 21, a second magnetic yoke 22, a first magnetism collecting ring 23, a second magnetism collecting ring 24, a first torque-detection magnetism sensor 25, a second torque-detection magnetism sensor 26, and a multipolar magnet 27, as illustrated in FIG. 3.

The multipolar magnet 27 is fixed to the input shaft of the pinion shaft 2 so as to be integrally rotatable therewith. The multipolar magnet 27 has a cylindrical shape, with S poles and N poles arranged alternating along the circumferential direction thereof. The output shaft of the pinion shaft 2 has a cylindrical portion, and this cylindrical portion extends toward the input shaft side of the pinion shaft 2, covering the input shaft of the pinion shaft 2. The first magnetic yoke 21 and the second magnetic yoke 22 are fixed to the cylindrical portion of the output shaft of the pinion shaft 2. The multipolar magnet 27 is positioned on the inner side in the radial direction of the first magnetic yoke 21 and the second magnetic yoke 22. The first magnetic yoke 21 and the second magnetic yoke 22 constitute a magnetic circuit in accordance with a magnetic field of the multipolar magnet 27.

The first magnetic yoke 21 has an annular disc-like annular portion 21a and a plurality of plate-like teeth 21b. The teeth 21b are disposed equidistantly along an inner circumferential edge of the annular portion 21a. The teeth 21b extend along the axial direction X of the pinion shaft 2. The second magnetic yoke 22 has an annular disc-like annular portion 22a and a plurality of teeth 22b, in the same way as the first magnetic yoke 21. The teeth 22b are disposed equidistantly along an inner circumferential edge of the annular portion 22a. The teeth 22b extend along the axial direction X of the pinion shaft 2. The teeth 21b of the first magnetic yoke 21 and the teeth 22b of the second magnetic yoke 22 extend in opposite directions to each other in the axial direction X of the pinion shaft 2, and also are situated alternating in the circumferential direction.

The first magnetism collecting ring 23 and the second magnetism collecting ring 24 are disposed side by side in the axial direction X of the pinion shaft 2. The first magnetism collecting ring 23 and the second magnetism collecting ring 24 are attached to the inside of the sensor housing 10. The first magnetism collecting ring 23 is disposed surrounding the first magnetic yoke 21. The second magnetism collecting ring 24 is disposed surrounding the second magnetic yoke 22. The first magnetism collecting ring 23 inducts magnetic flux from the first magnetic yoke 21. The second magnetism collecting ring 24 inducts magnetic flux from the second magnetic yoke 22.

The first magnetism collecting ring 23 includes a first ring portion 23a and a first magnetism collecting portion 23b. The first ring portion 23a is provided in a letter-C shape curving along the outer circumferential face of the first magnetic yoke 21. The first magnetism collecting portion 23b has two fixing portions 23c, 23d, a linking portion 23e, and two first magnetism collecting protrusions 23f, 23g. The two fixing portions 23c, 23d are portions attached to the outer circumferential face of the first ring portion 23a. The two fixing portions 23c, 23d curve along the outer circumferential face of the first ring portion 23a. The linking portion 23e is a portion linking the two fixing portions 23c, 23d. A gap is provided between the face of the linking portion 23e toward the first ring portion 23a side and the outer circumferential face of the first ring portion 23a. The two first magnetism collecting protrusions 23f, 23g are provided at the end portion of the linking portion 23e toward the second magnetism collecting ring 24 side. The two first magnetism collecting protrusions 23f, 23g extend toward the outer side in the radial direction of the first ring portion 23a.

The second magnetism collecting ring 24 has a second ring portion 24a and two second magnetism collecting protrusions 24b, 24c. The second ring portion 24a is provided in a letter-C shape curving along the outer circumferential face of the second magnetic yoke 22. The two second magnetism collecting protrusions 24b, 24c extend toward the outer side in the radial direction of the second ring portion 24a. The two second magnetism collecting protrusions 24b, 24c face the two first magnetism collecting protrusions 23f, 23g of the first magnetism collecting ring 23 in the axial direction X of the pinion shaft 2. The first torque-detection magnetism sensor 25 is interposed between the first magnetism collecting protrusion 23f and the second magnetism collecting protrusion 24b. The second torque-detection magnetism sensor 26 is interposed between the first magnetism collecting protrusion 23g and the second magnetism collecting protrusion 24c. The first torque-detection magnetism sensor 25 and the second torque-detection magnetism sensor 26 are disposed on a later-described board 35. The first torque-detection magnetism sensor 25 and the second torque-detection magnetism sensor 26 are magnetism sensors that detect magnetic fluxes inducted to the first magnetism collecting ring 23 and the second magnetism collecting ring 24. Hall sensors, for example, are employed as the first torque-detection magnetism sensor 25 and the second torque-detection magnetism sensor 26.

When the torsion bar of the pinion shaft 2 exhibits twisting deformation through operations of the steering wheel, the relative position in the rotational direction of the multipolar magnet 27 and the first magnetic yoke 21, and the relative position in the rotational direction of the multipolar magnet 27 and the second magnetic yoke 22, change. This changes the magnetic flux density guided from the multipolar magnet 27 to the first magnetism collecting ring 23 through the first magnetic yoke 21. The density of the magnetic flux guided from the multipolar magnet 27 to the second magnetism collecting ring 24 through the second magnetic yoke 22 also changes.

Figure 4:
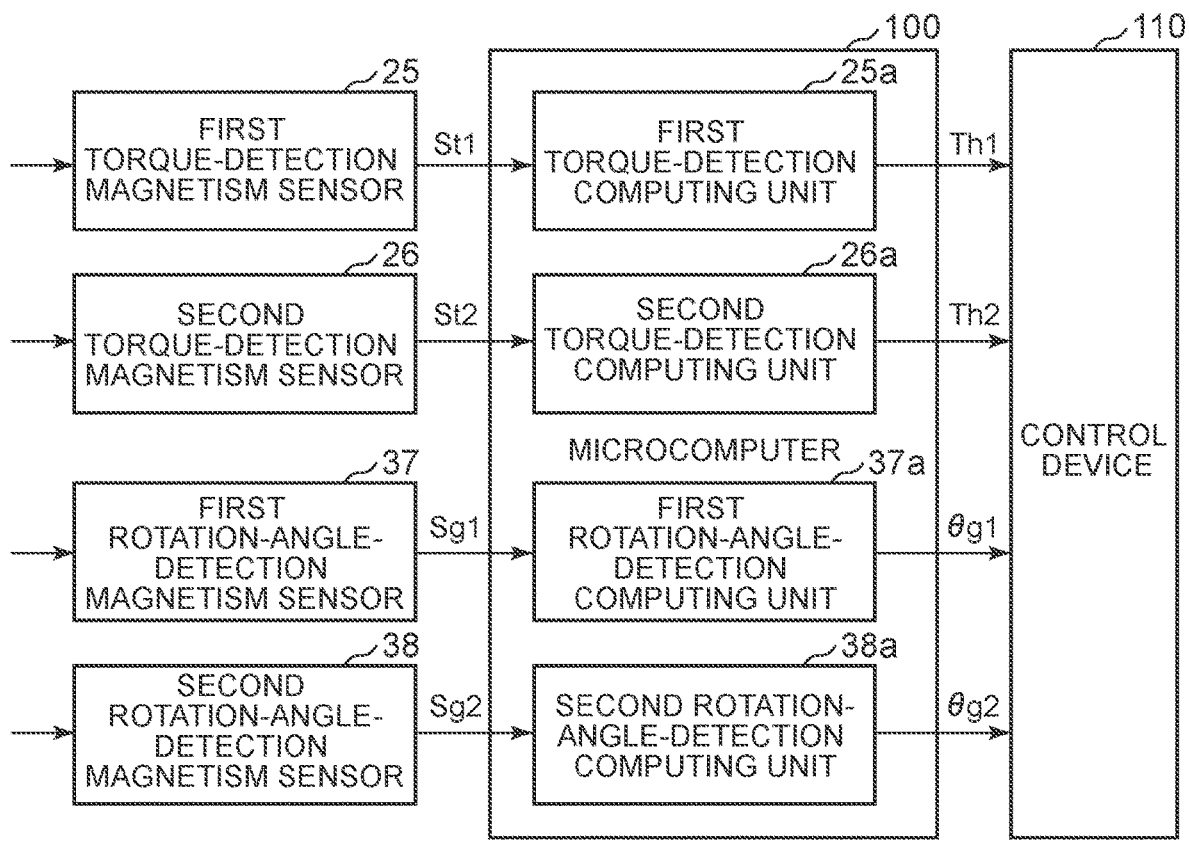
FIG. 4 is a block diagram illustrating a schematic configuration of sensors, a microcomputer, and a control device.

As illustrated in FIG. 4, the first torque-detection magnetism sensor 25 is connected to a first torque-detection computing unit 25a. The second torque-detection magnetism sensor 26 is connected to a second torque-detection computing unit 26a. The first torque-detection magnetism sensor 25 generates electric signals St1 in accordance with the magnetic flux density. Torque acting on the torsion bar is computed by the first torque-detection computing unit 25a as first steering torque Th1 based on the electric signals St1 generated by the first torque-detection magnetism sensor 25. Also, the second torque-detection magnetism sensor 26 generates electric signals St2 in accordance with the magnetic flux density. Torque acting on the torsion bar is computed by the second torque-detection computing unit 26a as second steering torque Th2 based on the electric signals St2 generated by the second torque-detection magnetism sensor 26.

The rotation angle sensor 30 has a main driving gear 31, a first driven gear 32, a second driven gear 33, a supporting member 34, the board 35, a biasing member 36, a first rotation-angle-detection magnetism sensor 37, and a second rotation-angle-detection magnetism sensor 38, as illustrated in FIGS. 1 and 2.

The main driving gear 31 is provided to the input shaft of the pinion shaft 2 so as to be integrally rotatable therewith. The main driving gear 31 has a cylindrical shape, has a plurality of teeth 31a provided on the outer circumferential face thereof, and has the input shaft of the pinion shaft 2 fit into the inner circumferential face thereof. The number of teeth of the teeth 31a provided on the outer circumferential face of the main driving gear 31 is set to 48 teeth, for example.

The board 35 is attached to an inner bottom face of the accommodation portion 12 of the sensor housing 10. The supporting member 34 rotatably supports the first driven gear 32 and the second driven gear 33. The supporting member 34 is attached to the inner bottom face of the accommodation portion 12 of the sensor housing 10. A gap is provided between a middle portion of the supporting member 34 and the inner bottom face of the accommodation portion 12, and the board 35 is fit in between the supporting member 34 and the inner bottom face of the accommodation portion 12. The supporting member 34 has a rectangular plate form. A long-side face 34a of the supporting member 34 faces the main driving gear 31. A first supporting hole 50 and a second supporting hole 51 are provided in the supporting member 34. The first supporting hole 50 and the second supporting hole 51 are holes in the supporting member 34, extending in the axial direction X of the pinion shaft 2. The first supporting hole 50 is provided in the proximity of a first corner portion on one side of the supporting member 34, where a first short-side face 34b and the long-side face 34a at the main driving gear 31 side intersect. The second supporting hole 51 is provided in the proximity of a second corner portion on the other side of the supporting member 34, where a second short-side face 34c and the long-side face 34a at the main driving gear 31 side intersect. The first supporting hole 50 and the second supporting hole 51 are shaped as slots extending along the radial direction of the main driving gear 31 when viewed from the axial direction X of the pinion shaft 2. The distance of separation between the first supporting hole 50 and the second supporting hole 51 is shortest at the main driving gear 31 side, and the distance of separation thereof is longer the farther away from the main driving gear 31.

The first driven gear 32 has a disc-like gear portion 61 and a columnar shaft portion 62. A plurality of teeth 61a is provided on the outer circumferential face of the gear portion 61. The teeth 61a of the gear portion 61 mesh with the teeth 31a of the main driving gear 31. The number of teeth of the teeth 61a provided on the outer circumferential face of the gear portion 61 is set to 24 teeth, for example. That is to say, the number of teeth of the teeth 61a of the first driven gear 32 is a half (½) the number of teeth as compared to the number of teeth of the teeth 31a of the main driving gear 31. One end face of the shaft portion 62 is connected to the middle of the face of the gear portion 61 toward the board 35 side. The outer diameter of the shaft portion 62 is set to be smaller than the outer diameter of the gear portion 61. A recessed portion 62a is provided on the other end face of the shaft portion 62 toward the board 35 side. The recessed portion 62a has a circular cross-sectional form at a cross-section of the shaft portion 62 taken in a direction orthogonal to the axial direction X. A disc-like first permanent magnet 62b is disposed in the recessed portion 62a. The first permanent magnet 62b is magnetized such that magnetic poles of different polarity are arranged alternating in the circumferential direction thereof. When the main driving gear 31 rotates, the first permanent magnet 62b provided to the first driven gear 32 that meshes with the main driving gear 31 rotates. The first driven gear 32 is an example of a "correction-object driven gear" in the Claims.

The second driven gear 33 has a disc-like gear portion 63 and a columnar shaft portion 64. Teeth 63a of the gear portion 63 mesh with the teeth 31a of the main driving gear 31. The number of teeth of the teeth 63a provided on the outer circumferential face of the gear portion 63 differs from the number of teeth of the teeth 61a of the gear portion 61 of the first driven gear 32, and is set to 26 teeth, for example. A recessed portion 64a is provided on the other end face of the shaft portion 64 toward the board 35 side. The recessed portion 64a has a circular cross-sectional form at a cross-section of the shaft portion 64 taken in a direction orthogonal to the axial direction X. A disc-like second permanent magnet 64b is disposed in the recessed portion 64a. The first driven gear 32 and the second driven gear 33 have the same shape, except that the number of teeth of the teeth 63a of the gear portion 63 of the second driven gear 33 is different from the number of teeth of the teeth 61a of the gear portion 61 of the first driven gear 32. When the main driving gear 31 rotates, the second permanent magnet 64b provided to the second driven gear 33 that meshes with the main driving gear 31 rotates. The second driven gear 33 is an example of a "correction-exempt driven gear" in the Claims.

A plate-like stopper 53 is mounted to the supporting member 34. The stopper 53 covers the face of the supporting member 34 to the opposite side from the board 35. Movement of the first driven gear 32 and the second driven gear 33 toward the opposite side from the board 35 is restricted by the gear portion 61 and the gear portion 63 abutting the stopper 53.

A columnar post portion 52 is provided on the face of the supporting member 34 opposite from the board 35, as illustrated in FIG. 1. The post portion 52 is provided at a position between the first supporting hole 50 and the second supporting hole 51 in the longitudinal direction of the supporting member 34, and at a position farther away from the main driving gear 31 than the first supporting hole 50 and the second supporting hole 51 in the lateral direction of the supporting member 34. The biasing member 36 is supported by the supporting member 34 by being mounted to the post portion 52. A metal torsion coil spring is employed for the biasing member 36.

The biasing member 36 has an overall general letter-V shape. The biasing member 36 has a coil portion 36a that is provided at the middle portion thereof by being wound a plurality of number of times, and also has a first arm portion 36b and a second arm portion 36c that extend linearly provided on both ends thereof. The annular coil portion 36a is mounted by the post portion 52 being inserted thereto. The first arm portion 36b is connected to one end portion of the coil portion 36a, and also the second arm portion 36c is connected to the other end portion of the coil portion 36a. The first arm portion 36b abuts against the side portion of the shaft portion 62 that is on the opposite side from the main driving gear 31. The second arm portion 36c abuts against the side portion of the shaft portion 64 that is on the opposite side from the main driving gear 31. The first arm portion 36b and the second arm portion 36c elastically deform so as to narrow the angle between the first arm portion 36b and the second arm portion 36c, centered on the coil portion 36a. The shaft portion 62 and the shaft portion 64 are constantly biased in the direction toward the main driving gear 31 by the elastic force of the biasing member 36.

The first rotation-angle-detection magnetism sensor 37 is mounted on the face of the board 35 toward the first driven gear 32 side, as illustrated in FIG. 2. The first rotation-angle-detection magnetism sensor 37 faces the first permanent magnet 62b in the axial direction X. The second rotation-angle-detection magnetism sensor 38 is mounted on the face of the board 35 toward the second driven gear 33 side. The second rotation-angle-detection magnetism sensor 38 faces the second permanent magnet 64b in the axial direction X. The first rotation-angle-detection magnetism sensor 37 and the second rotation-angle-detection magnetism sensor 38 are magnetism sensors that detect magnetic fluxes from the first permanent magnet 62b and the second permanent magnet 64b. Hall sensors, for example, are used as the first rotation-angle-detection magnetism sensor 37 and the second rotation-angle-detection magnetism sensor 38. The first rotation-angle-detection magnetism sensor 37 is an example of a "first sensor" in the Claims. The second rotation-angle-detection magnetism sensor 38 is an example of a "second sensor" in the Claims.

The first rotation-angle-detection magnetism sensor 37 is connected to a first rotation-angle-detection computing unit 37a, as illustrated in FIG. 4. The first rotation-angle-detection magnetism sensor 37 generates electrical signals Sg1 in accordance with the magnetic flux density input from the first permanent magnet 62b. The first rotation-angle-detection computing unit 37a computes a first driven-side rotation angle θg1 that is the rotation angle of the first driven gear 32, based on the electrical signals Sg1 generated by the first rotation-angle-detection magnetism sensor 37. The second rotation-angle-detection magnetism sensor 38 is connected to a second rotation-angle-detection computing unit 38a. The second rotation-angle-detection magnetism sensor 38 generates electrical signals Sg2 in accordance with the magnetic flux density input from the second permanent magnet 64b. The second rotation-angle-detection computing unit 38a computes a second driven-side rotation angle θg2 that is the rotation angle of the second driven gear 33, based on the electrical signals Sg2 generated by the second rotation-angle-detection magnetism sensor 38. The first torque-detection computing unit 25a, the second torque-detection computing unit 26a, the first rotation-angle-detection computing unit 37a, and the second rotation-angle-detection computing unit 38a constitute a microcomputer 100. The detection device 1 is an example of a "rotation angle detection device" in the Claims. When computing the first driven-side rotation angle θg1, the detection device 1 corrects the first driven-side rotation angle θg1, and is provided with the first driven gear 32, the first rotation-angle-detection magnetism sensor 37, and the microcomputer 100 of the detection device 1. Also, the microcomputer 100 is an example of an "electronic control unit" in the Claims.

The microcomputer 100 is connected to a control device 110. The microcomputer 100 provides the control device 110 with the first driven-side rotation angle θg1 and the second driven-side rotation angle θg2 that have been computed. The control device 110 acquires the first driven-side rotation angle θg1 and the second driven-side rotation angle θg2 computed by the microcomputer 100. The control device 110 computes the rotation angle of the main driving gear 31, i.e., the rotation angle of the pinion shaft 2, as the absolute angle θpa, based on the first driven-side rotation angle θg1 and the second driven-side rotation angle θg2. More specifically, the control device 110 uses a value in which the arc tangent is obtained from the first driven-side rotation angle θg1 and a value in which the arc tangent is obtained from the second driven-side rotation angle θg2 to compute the absolute angle θpa of the pinion shaft 2. Computation of the absolute angle θpa by the control device 110 will be described with reference to FIG. 5.

Figure 5:
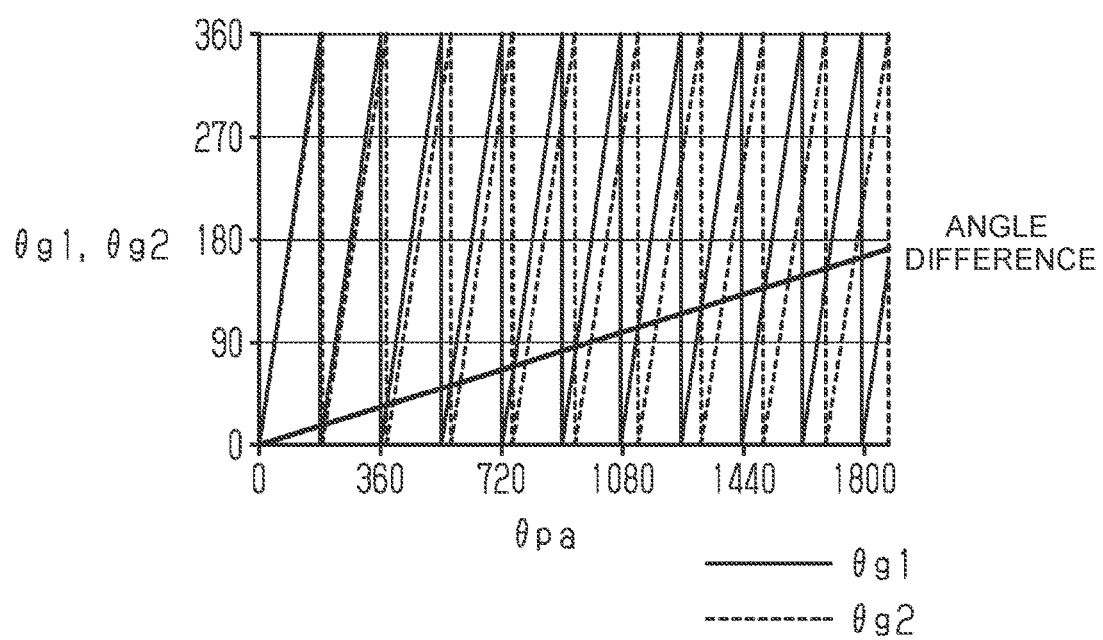
FIG. 5 is a graph illustrating a relation between a first driven-side rotation angle and a second driven-side rotation angle, and an absolute angle of the pinion shaft.

The vertical axis of the graph in FIG. 5 represents the first driven-side rotation angle θg1 and the second driven-side rotation angle θg2, and the horizontal axis represents the absolute angle θpa of the pinion shaft 2. The continuous lines represent the transition of the first driven-side rotation angle θg1, and the dashed lines represent the transition of the second driven-side rotation angle θg2. Note that the first rotation-angle-detection magnetism sensor 37 and the second rotation-angle-detection magnetism sensor 38 each have the same shaft angle multiplier of 1×. The phase of the waveform of the first driven-side rotation angle θg1 indicated by the continuous lines and the phase of the waveform of the second driven-side rotation angle θg2 indicated by the dashed lines deviate as the pinion shaft 2 rotates due to the difference in the number of teeth of the teeth 61a of the first driven gear 32 and the number of teeth of the teeth 63a of the second driven gear 33. Note that the first driven-side rotation angle θg1 and the second driven-side rotation angle θg2 are relative angles exhibited in an angle domain that the first rotation-angle-detection magnetism sensor 37 and the second rotation-angle-detection magnetism sensor 38, which are each relative angle sensors, can perform detection, i.e., in the angle domain of 0 to 360 degrees. Accordingly, the first driven-side rotation angle θg1 alone or the second driven-side rotation angle θg2 alone cannot enable comprehension of the rotation angle of the first driven gear 32 and the second driven gear 33 in terms of how many rotations have been made to reach the current rotation angle, and the absolute angle θpa that is the rotation angle in a plurality of rotations of the pinion shaft 2 cannot be obtained.

The control device 110 computes the angle difference between the first driven-side rotation angle θg1 and the second driven-side rotation angle θg2. The heavy continuous line in the graph in FIG. 5 indicates the absolute value of angle difference between the first driven-side rotation angle θg1 and the second driven-side rotation angle θg2.

The control device 110 computes the number of rotations γ of the first driven gear 32 based on the value of the angle difference between the first driven-side rotation angle θg1 and the second driven-side rotation angle θg2, by referencing a table omitted from illustration. The number of rotations γ is an integer value indicating how many cycles of electrical signals have been generated by the first rotation-angle-detection magnetism sensor 37 to the current cycle, i.e., how many times the angle domain in which the first rotation-angle-detection magnetism sensor 37 can perform detection has been repeated. The table defines the relation among three items, namely, the angle difference between the first driven-side rotation angle θg1 and the second driven-side rotation angle θg2, the tolerance range of the angle difference, and the number of rotations γ of the first driven gear 32. The table defines the above-described three items for each 360 degrees that is an angle domain in which that the first rotation-angle-detection magnetism sensor 37 can perform detection, over the entirety of the angle domain in which the absolute angle θpa is computed. Based on the value of angle difference of the first driven-side rotation angle θg1 and the second driven-side rotation angle θg2, the control device 110 determines items in the table to which the angle difference belongs, and detects the number of rotations γ corresponding to the items.

The control device 110 computes the absolute angle θpa based on the first driven-side rotation angle θg1 of the first driven gear 32 and the number of rotations γ of the first driven gear 32. Such an absolute angle θpa that is the rotation angle over a plurality of rotations of the pinion shaft 2 exceeding 360 degrees is obtained based on the following Expression (1), for example.

$$\theta pa = m\alpha/z + (m/z)\Omega\gamma \quad (1)$$

Here, "m" is the number of teeth of the teeth 61a of the first driven gear 32, "z" is the number of teeth of the teeth 31a of the main driving gear 31, "Ω" is the angle domain in which the first rotation-angle-detection magnetism sensor 37 can perform detection, and "a" is the first driven-side rotation angle θg1. In the present embodiment, "m" is 24, "z" is 48, and "Ω" is 360 degrees. The "mα/z" indicates the rotation angle of the main driving gear 31 as to the first driven-side rotation angle θg1 of the first driven gear 32 in the detection range Ω of the first rotation-angle-detection magnetism sensor 37. The control device 110 computes the absolute angle θpa based on Expression (1).

The control device 110 acquires the first steering torque Th1 and the second steering torque Th2 computed by the microcomputer 100. The control device 110 executes control of applying electric power to a motor provided to the steering device of the vehicle, for example, based on the absolute angle θpa, the first steering torque Th1, and the second steering torque Th2.

The first rotation-angle-detection computing unit 37a of the microcomputer 100 is provided with a function of correcting the first driven-side rotation angle θg1 over the angle domain of 0 to 360 degrees. On the other hand, the second rotation-angle-detection computing unit 38a of the microcomputer 100 is not provided with the function of correcting the second driven-side rotation angle θg2 in the angle domain of 0 to 360 degrees. The first driven gear 32 is used to compute the rotation angle of the main driving gear 31, and the second driven gear 33 is used to compute the number of rotations of the main driving gear 31.

When computing the first driven-side rotation angle θg1, the first rotation-angle-detection computing unit 37a corrects the first driven-side rotation angle θg1 using a correction angle θc. The first rotation-angle-detection computing unit 37a stores the correction angle θc to be used to correct the first driven-side rotation angle θg1.

Figure 6:
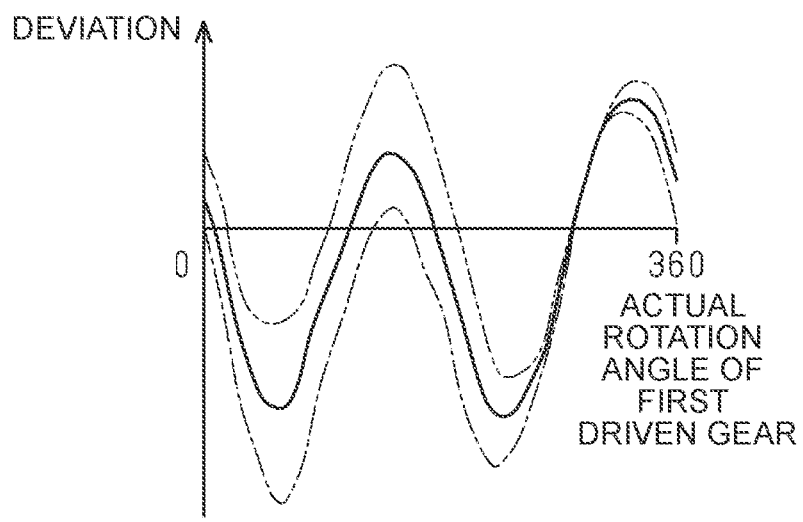
FIG. 6 is a graph illustrating a relation between the first driven-side rotation angle prior to correction and a correction angle, in an angle domain of 0 to 360 degrees.

FIG. 6 shows the correction angle θc stored in the first rotation-angle-detection computing unit 37a as a continuous line. The first rotation-angle-detection computing unit 37a stores the correction angle θc over the angle domain of 0 to 360 degrees. Storing the correction angle θc over the angle domain of 0 to 360 degrees corresponds to the first rotation-angle-detection magnetism sensor 37 being a relative angle sensor that detects the first driven-side rotation angle θg1 of the first driven gear 32 over the angle domain of 0 to 360 degrees.

The first rotation-angle-detection computing unit 37a computes the first driven-side rotation angle θg1 prior to correction based on the electrical signals Sg1, and performs correction by adding the correction angle θc corresponding to the first driven-side rotation angle θg1 to the first driven-side rotation angle θg1, thereby computing the first driven-side rotation angle θg1 following correction, as illustrated in FIG. 5. The first rotation-angle-detection computing unit 37a provides the first driven-side rotation angle θg1 following correction to the control device 110.

How to obtain the correction angle θc will be described. The correction angle θc is stored in the first rotation-angle-detection computing unit 37a at the time of shipping from the factory, or the like. When obtaining the correction angle θc, first, the first driven gear 32 is rotated twice, and the first driven-side rotation angle θg1 is obtained for the full angle domain thereof. The reason why the first driven gear 32 is rotated twice is because the number of teeth of the teeth 61a of the first driven gear 32 is the number of teeth of the teeth 31a of the main driving gear 31 divided by 2. Due to the relation in which the main driving gear 31 makes one rotation when the first driven gear 32 makes two rotations, meshing of the first driven gear 32 and the main driving gear 31 is the same for the first rotation and the third rotation of the first driven gear 32, and is the same for the second rotation and the fourth rotation thereof. All meshing of the first driven gear 32 and the main driving gear 31 occurs while the first driven gear 32 is rotated for two rotations, and accordingly, when obtaining the correction angle θc, the first driven gear 32 is rotated for two rotations and the first driven-side rotation angle θg1 is obtained over the full angle domain. Note that the number "2", which is the number of rotations of the first driven gear 32 to obtain the first driven-side rotation angle θg1, and also is the number of deviations used to obtain the later-described average of deviation, is set to the number of rotations corresponding to one rotation of the pinion shaft 2 that is the component with the longest cycle out of all components relating to rotation of the pinion shaft 2. In other words, this "2" is a number that is set to a number obtained by dividing the number of teeth of the least common multiple of the number of teeth of the teeth 31a of the main driving gear 31 provided integrally rotatable to the input shaft of the pinion shaft 2 and the number of teeth of the teeth 61a of the first driven gear 32, by the number of teeth of the teeth 61a of the first driven gear 32.

Figure 7:
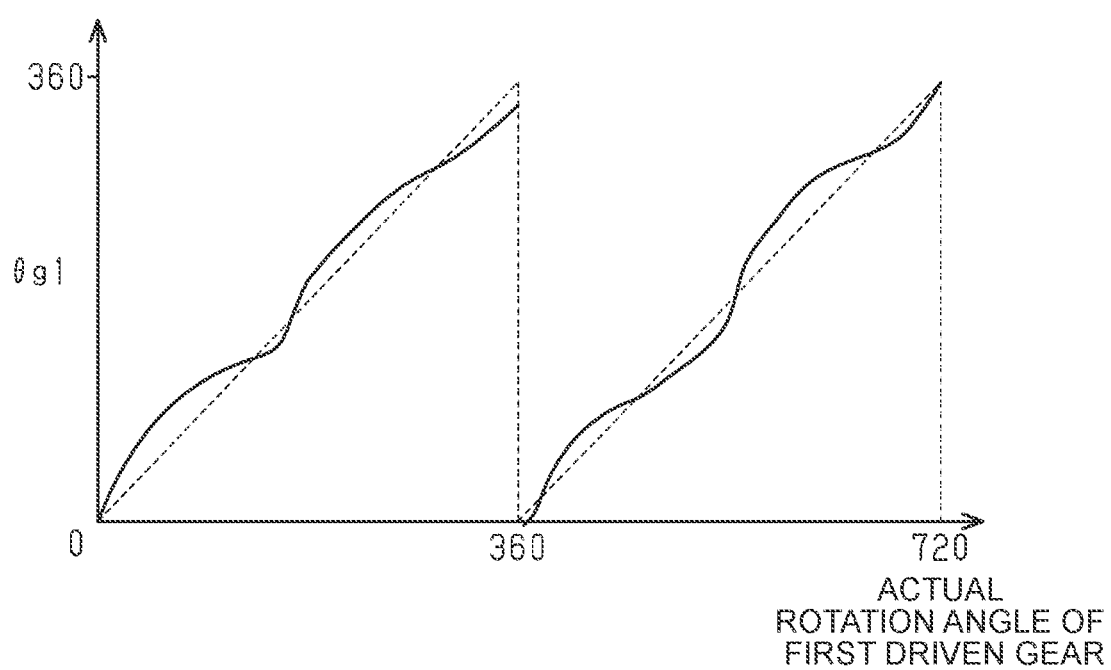
FIG. 7 is a graph illustrating a relation between the first driven-side rotation angle prior to correction and the actual rotation angle of the first driven gear, over a full angle domain.

In FIG. 7, the first driven-side rotation angle θg1 obtained by computation at the time of obtaining the correction angle θc is shown by continuous lines, and the actual rotation angle of the first driven gear 32 is shown by dashed lines. The actual rotation angle of the first driven gear 32 is not the designed rotation angle of the first driven gear 32, but rather is an ideal angle when ideally acquiring the rotation angle that the first driven gear 32 actually exhibits. FIG. 7 shows the first driven-side rotation angle θg1 obtained when the first driven gear 32 is rotated twice, i.e., over the full angle domain of 0 to 720 degrees, and the actual rotation angle of the first driven gear 32. As shown in FIG. 7, the obtained first driven-side rotation angle θg1 and the actual rotation angle of the first driven gear 32 do not completely agree, and there is divergence therebetween.

Figure 8:
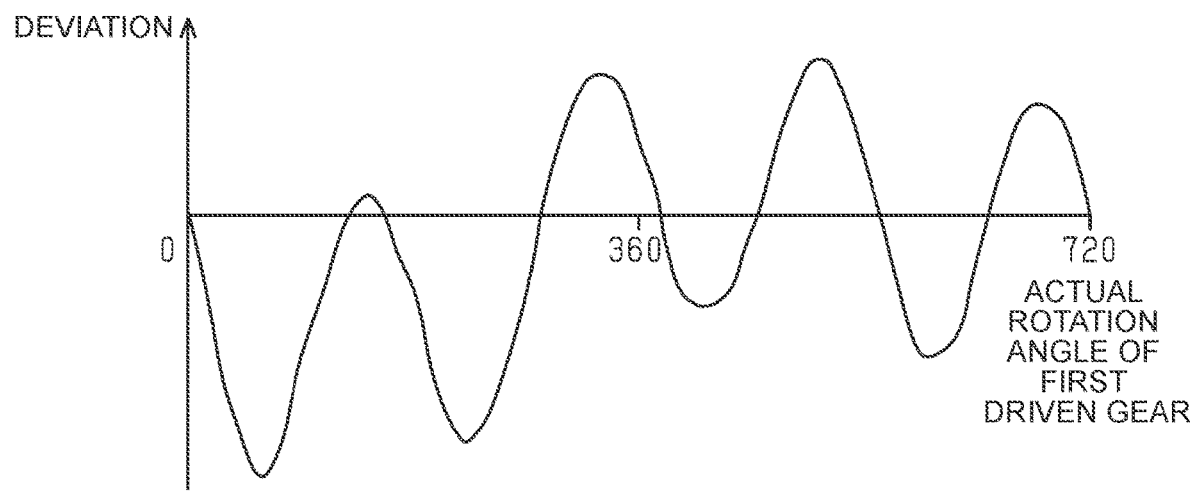
FIG. 8 is a graph of deviation obtained between the first driven-side rotation angle prior to correction and the actual rotation angle of the first driven gear, over the full angle domain.

Next, the deviation between the obtained first driven-side rotation angle θg1 and the actual rotation angle of the first driven gear 32 is obtained over the full angle domain. FIG. 8 shows the deviation between the obtained first driven-side rotation angle θg1 and the actual rotation angle of the first driven gear 32 by a continuous line. This deviation may be the same in the angle domain from 0 to 360 degrees and the angle domain of 360 to 720 degrees, but may be different between the angle domain of 0 to 360 degrees and the angle domain of 360 to 720 degrees, as shown in FIG. 8. In FIG. 8, a situation often occurs in which there is divergence in which the first driven-side rotation angle θg1 prior to correction is greater than the actual rotation angle of the first driven gear 32 in the angle domain of 0 to 360 degrees, and accordingly the overall deviation is often negative. In comparison with this, in FIG. 8, a situation often occurs in which there is divergence in which the first driven-side rotation angle θg1 prior to correction is smaller than the actual rotation angle of the first driven gear 32 in the angle domain of 360 to 720 degrees as compared with in the angle domain of 0 to 360 degrees, and accordingly the overall deviation is often positive. Note that factors causing divergence include electrical error in sensor output and mechanical error of gears. An example of electrical error in sensor output is variance in the electrical signals Sg1, Sg2 generated in accordance with the magnetic flux densities that are input. Examples of mechanical error of gears are chipping, wear, and so forth, of the teeth 31a of the main driving gear 31 and the teeth 61a of the first driven gear 32.

Next, the deviations are averaged such that the deviation over the full angle domain of 0 to 720 degrees is the deviation in the angle domain of 0 to 360 degrees. The need to set to the deviation in the angle domain of 0 to 360 degrees corresponds to the first rotation-angle-detection magnetism sensor 37 being a relative angle sensor that detects the first driven-side rotation angle θg1 of the first driven gear 32 in the angle domain of 0 to 360 degrees.

FIG. 6 shows the deviation in the angle domain of 0 to 360 degrees by a long dashed short dashed line, shows the deviation in the angle domain of 360 to 720 degrees by a long dashed double-short dashed line, and shows a median line between the deviation in the angle domain of 0 to 360 degrees and the deviation in the angle domain of 360 to 720 degrees, i.e., the average value of these deviations, by a continuous line. That is to say, average values obtained by averaging the two deviations corresponding to each same relative rotational angle such that the deviation over the full angle domain of 0 to 720 degrees is the deviation in the angle domain from 0 to 360 degrees are plotted as a continuous line. The sum of the deviation in the angle domain of 0 to 360 degrees and the deviation in the angle domain of 360 to 720 degrees at each same relative rotational angle is divided by 2, thereby obtaining average values in which these two deviations are averaged. The term average as used in the present embodiment is the arithmetic mean, and the average value is the arithmetic mean value. The average value at 180 degrees, as an example of a same relative rotational angle, is obtained using the deviation at an absolute rotation angle of 180 degrees and the deviation at an absolute rotation angle of 540 degrees. The first rotation-angle-detection computing unit 37a stores average values of deviations obtained in this way as the correction angle θc.

Advantageous effects of the present embodiment will be described. The correction angle θc stored in the first rotation-angle-detection computing unit 37a of the microcomputer 100 is an average value obtained by averaging two deviations corresponding to the same relative rotation angle. At the time of obtaining the correction angle θc, the correction angle is obtained taking into consideration not only deviation in the angle domain of 0 to 360 degrees, but also deviation in the angle domain exceeding 360 degrees. The first driven-side rotation angle θg1 is corrected based on the correction angle θc obtained taking into consideration deviation in the angle domain exceeding 360 degrees as well, and accordingly, the first driven-side rotation angle θg1 can be corrected more appropriately overall as compared to correcting the first driven-side rotation angle θg1 based on a correction angle obtained from deviation in the angle domain of 0 to 360 degrees alone.

For example, the correction angle when the rotation angle of the first driven gear 32 is 540 degrees conventionally is set based on the deviation when the rotation angle of the first driven gear 32 is 180 degrees, without taking into consideration the deviation when the rotation angle of the first driven gear 32 is 540 degrees. However, even though the relative rotation angle of the first driven gear 32 is the same 180 degrees when 180 degrees and when 540 degrees, the position at which the main driving gear 31 and the first driven gear 32 mesh is different, and accordingly the rotation angle of the first driven gear 32 should be corrected at different correction angles for each.

Figure 9:
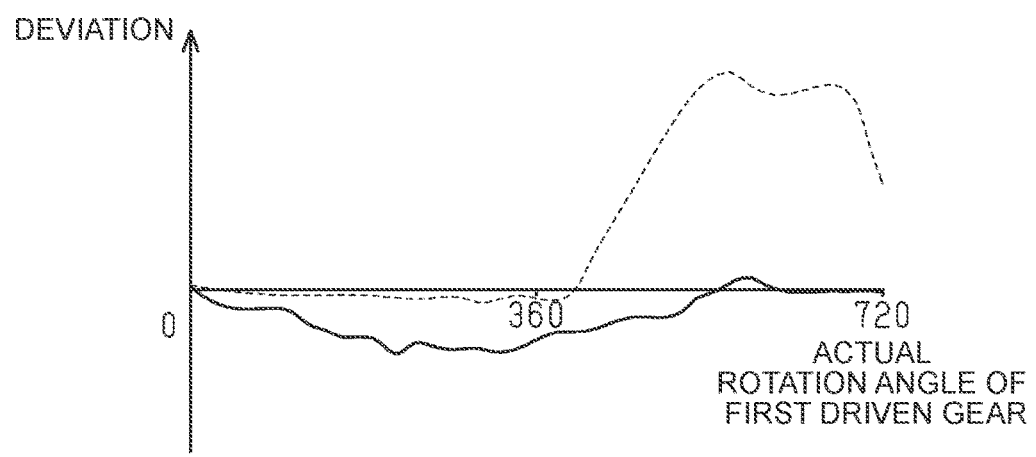
FIG. 9 is a graph of deviation obtained between the first driven-side rotation angle following correction and the actual rotation angle of the first driven gear, over the full angle domain, in which the continuous line indicates an embodiment of the disclosure, and the dashed line indicates a conventional arrangement of correcting the first driven-side rotation angle based on a correction angle obtained using just deviation in an angle domain of 0 to 360 degrees.

In FIG. 9, the dashed line represents the divergence between the first driven-side rotation angle θg1 following correction and the actual rotation angle of the first driven gear 32, when the first driven-side rotation angle θg1 is corrected based on a correction angle obtained from deviation in the angle domain of 0 to 360 degrees alone. In this case, although the divergence between the first driven-side rotation angle θg1 following correction and the actual rotation angle of the first driven gear 32 is small in the angle domain of 0 to 360 degrees, the divergence between the first driven-side rotation angle θg1 following correction and the actual rotation angle of the first driven gear 32 is great in the angle region exceeding 360 degrees.

In the present embodiment, the first driven-side rotation angle θg1 of the first driven gear 32 is corrected taking into consideration both the deviation in 0 to 360 degrees and the deviation exceeding 360 degrees, as illustrated in FIG. 8. For example, in the present embodiment, the correction angle θc when the rotation angle of the first driven gear 32 is 540 degrees is set to the average value between the deviation when the rotation angle of the first driven gear 32 is 180 degrees and the deviation when the rotation angle of the first driven gear 32 is 540 degrees. That is to say, the correction angle θc when the rotation angle of the first driven gear 32 is 540 degrees takes into consideration the deviation when the rotation angle of the first driven gear 32 is 540 degrees, in addition to the deviation when the rotation angle of the first driven gear 32 is 180 degrees. Accordingly, a situation in which the divergence between the first driven-side rotation angle θg1 following correction and the actual rotation angle of the first driven gear 32 is greater than the divergence between the first driven-side rotation angle θg1 prior to correction and the actual rotation angle of the first driven gear 32 can be suppressed.

In FIG. 9, the continuous line represents the divergence between the first driven-side rotation angle θg1 following correction and the actual rotation angle of the first driven gear 32, when the first driven-side rotation angle θg1 is corrected based on the correction angle θc. In this case, increase in the divergence between the first driven-side rotation angle θg1 following correction and the actual rotation angle of the first driven gear 32 in the angle domain exceeding 360 degrees is suppressed as compared to the case indicated by the dashed line. That is to say, a situation can be suppressed in which the divergence in the angle domain exceeding 360 degrees is a great divergence as compared to the divergence in the angle domain of 0 to 360 degrees, when comparing the divergence in the angle domain of 0 to 360 degrees with the divergence in the angle domain exceeding 360 degrees. Accordingly, divergence between the rotation angle of the first driven gear 32 following correction and the actual rotation angle of the first driven gear 32 can be suppressed overall. Thus, the first driven-side rotation angle θg1 can be corrected more appropriately overall.

Advantages of the present embodiment will be described. The first driven-side rotation angle θg1 can be corrected more appropriately, and accordingly the detection precision of the first driven-side rotation angle θg1 can be raised.

By being provided with the second driven gear 33 that has a different number of teeth as compared to the first driven gear 32, information when obtaining the rotation angle or number of rotations of the main driving gear 31, i.e., the pinion shaft 2, can be provided.

The second driven gear 33 is used to obtain the number of rotations of the first driven gear 32. With regard to the second driven gear 33, being able to obtain the rotation angle at a level in which the number of rotations of the first driven gear 32 can be distinguished is sufficient, and whether correction is performed based on the correction angle does not greatly affect raising the detection precision of the rotation angle of the main driving gear 31. Accordingly, the second rotation-angle-detection computing unit 38a of the microcomputer 100 is not imparted with a function of correcting the second driven-side rotation angle θg2 that is detected. Thus, increase in the computation load on the microcomputer 100 can be suppressed as compared to when correcting the second driven-side rotation angle θg2 in the same way as the first driven-side rotation angle θg1.

Biasing the first driven gear 32 and the second driven gear 33 toward the main driving gear 31 enables the meshing between the main driving gear 31, and the first driven gear 32 and the second driven gear 33, to be suitably secured. However, in the detection device 1 provided with the biasing member 36, biasing the first driven gear 32 and the second driven gear 33 toward the main driving gear 31 suppresses occurrence of hysteresis at the first driven gear 32 and the second driven gear 33. Accordingly, computation of the first driven-side rotation angle θg1 and the second driven-side rotation angle θg2 tends to be affected more greatly by the state of the teeth 61a of the main driving gear 31. When biasing the first driven gear 32 toward the main driving gear 31, the following States (A) and (B) tend to occur more readily as compared to when not biasing the first driven gear 32 toward the main driving gear 31. State (A) is a state in which the first driven-side rotation angle θg1 prior to correction is greater than the actual rotation angle of the first driven gear 32 in the angle domain of 0 to 360 degrees, and the first driven-side rotation angle θg1 prior to correction is smaller than the actual rotation angle of the first driven gear 32 in the angle domain exceeding 360 degrees. State (B) is a state in which the first driven-side rotation angle θg1 prior to correction is smaller than the actual rotation angle of the first driven gear 32 in the angle domain of 0 to 360 degrees, and the first driven-side rotation angle θg1 prior to correction is greater than the actual rotation angle of the first driven gear 32 in the angle domain exceeding 360 degrees. When such states occur, conventionally, the divergence between the first driven-side rotation angle θg1 following correction and the actual rotation angle of the first driven gear 32 becomes great in the angle domain exceeding 360 degrees, as indicated by the dashed line in FIG. 9 used to describe the advantageous effects above. The detection device 1 having the biasing member 36 has such circumstances, and accordingly using the correction angle θc taking into consideration the deviation in the angle domain exceeding 360 degrees as well, yields the advantageous effects in that the first driven-side rotation angle θg1 can be corrected more appropriately.

Also, information regarding torque acting on the pinion shaft 2 can be provided, besides the first driven-side rotation angle θg1. The above-described embodiment may be modified as follows. Further, the following other embodiments may be combined with each other insofar as there is no technical contradiction.

The microcomputer 100 may function as the control device 110. That is to say, the microcomputer 100 may receive the electrical signals Sg1, Sg2, compute the first driven-side rotation angle θg1 and the second driven-side rotation angle θg2, and compute the absolute angle θpa based on the first driven-side rotation angle θg1 and the second driven-side rotation angle θg2. An arrangement in which the microcomputer 100 has a part that computes the first driven-side rotation angle θg1 and also corrects the first driven-side rotation angle θg1 when computing the first driven-side rotation angle θg1 is sufficient, and parts having other functions may be modified as appropriate.

Although description has been made that the control device 110 obtains the number of rotations γ from the first driven-side rotation angle θg1 and the second driven-side rotation angle θg2, and obtains the absolute angle θpa from the first driven-side rotation angle θg1 and the number of rotations γ based on Expression (1), this is not limiting. As illustrated in FIG. 5, the larger the absolute angle θpa is, the greater the absolute value of the angle difference is in proportion to the absolute angle θpa. Accordingly, the control device 110 stores a map representing the relation of the absolute angle θpa as to the absolute value of angle difference between the first driven-side rotation angle θg1 and the second driven-side rotation angle θg2, for example. The control device 110 may compute the angle difference between the first driven-side rotation angle θg1 and the second driven-side rotation angle θg2, and compute the absolute angle θpa from this angle difference.

Although description is made in the present embodiment that averaging is performed using the arithmetic mean when obtaining the average value in which the deviations are averaged, this is not limiting. For example, the geometric mean may be used when obtaining the average value in which the deviations are averaged.

Although description is made in the present embodiment that the first rotation-angle-detection computing unit 37a of the microcomputer 100 is imparted with a function of correcting the first driven-side rotation angle θg1, the function of correcting the first driven-side rotation angle θg1 may be imparted to another part of the microcomputer 100.

Although description is made in the present embodiment that the first rotation-angle-detection computing unit 37a of the microcomputer 100 stores the correction angle θc, the correction angle θc may be stored in another part of the microcomputer 100.

Although description is made in the present embodiment that the microcomputer 100 is not imparted with a function of correcting the second driven-side rotation angle θg2 that is detected, this function may be imparted. The number of teeth of the teeth 31a of the main driving gear 31, the teeth 61a of the first driven gear 32, and the teeth 63a of the second driven gear 33, may be modified as appropriate.

Although description is made in the present embodiment that the number of teeth of the teeth 61a of the first driven gear 32 is a number of teeth obtained by dividing the number of teeth of the teeth 31a of the main driving gear 31 by 2, this is not limiting. The number of teeth of the teeth 61a of the first driven gear 32 may be a number of teeth obtained by dividing the number of teeth of the teeth 31a of the main driving gear 31 by an integer of 3 or greater.

A configuration in which the rotation angle sensor 30 is provided with a single driven gear, or a configuration in which the rotation angle sensor 30 is provided with three or more driven gears, may be employed. That is to say, providing the rotation angle sensor 30 with one or more driven gears having a number of teeth obtained by dividing the number of teeth of the teeth 31a of the main driving gear 31 by an integer is sufficient.

Although description is made in the present embodiment that a torsion coil spring is employed as the biasing member 36 to bias the first driven gear 32 and the second driven gear 33 toward the main driving gear 31, this is not limiting. A leaf spring or some other coil spring or the like may be employed as the biasing member. For example, the biasing member that biases the first driven gear 32 toward the main driving gear 31 and the biasing member that biases the second driven gear 33 toward the main driving gear 31 may be configured as separate biasing members from each other.

Although description is made in the present embodiment that the biasing member 36 that biases the first driven gear 32 and the second driven gear 33 toward the main driving gear 31 is provided, an arrangement may be made in which the biasing member 36 is not provided. In this case, an arrangement in which the first driven gear 32 and the second driven gear 33 are rotatably supported with respect to the first supporting hole 50 and the second supporting hole 51 provided in the supporting member 34, for example, is sufficient.

In the present embodiment, the detection device 1 may be a rotation angle sensor 30 from which the torque sensor 20 is omitted. This rotation angle sensor 30 also has the same object as the detection device 1.

Although an example of a steering device of a vehicle has been given in the present embodiment as an installation location of the detection device 1, application may be made to other onboard devices having a rotation shaft. Also, the detection device 1 is not limited to onboard use.

What is claimed is:

1. A rotation angle detection device for a steering of a vehicle, the rotation angle detection device comprising:
   a correction-object driven gear that is a driven gear meshing with a main driving gear that is provided to a pinion shaft so as to be integrally rotatable with the pinion shaft that is linked to steering wheels;
   a first sensor that is configured to generate an electrical signal based on rotation of the correction-object driven gear;
   an electronic control unit that is configured to compute a driven-side rotation angle, which is a rotation angle of the correction-object driven gear, based on the electrical signal generated by the first sensor, wherein
   the number of teeth of the correction-object driven gear is the number of teeth obtained by dividing the number of teeth of the main driving gear by an integer,
   the electronic control unit is configured to store a correction angle used to correct the driven-side rotation angle when computing the driven-side rotation angle, and
   the correction angle is a predetermined deviation in a predetermined angle domain obtained as an average value in which deviations of a number equal to the integer and corresponding to the same relative rotation angle is averaged, so as to be deviation in an angle domain of 0 to 360 degrees, the predetermined deviation is a deviation obtained in the predetermined angle domain and is deviation between the driven-side rotation angle and an actual rotation angle of the correction-object driven gear, and the driven-side rotation angle is obtained over a full angle domain when the correction-object driven gear is rotated for a number of times equal to the integer;
   a correction-exempt driven gear that meshes with the main driving gear and is a different driven gear from the correction-object driven gear; and
   a second sensor that is configured to generate an electrical signal based on rotation of the correction-exempt driven gear, wherein
   the numbers of teeth of the correction-object driven gear and the correction-exempt driven gear are different from each other,
   the electronic control unit is configured to compute a rotation angle of the correction-exempt driven gear based on the electrical signal generated by the second sensor, and is configured not to perform correction of the rotation angle of the correction-exempt driven gear based on the correction angle, and
   the electronic control unit is configured to compute the number of rotations of the correction-object driven gear based on an angle difference between the rotation angle of the correction-object driven gear and the rotation angle of the correction-exempt driven gear.

2. The rotation angle detection device according to claim 1, further comprising:
   a biasing member that is configured to bias the correction-object driven gear toward the main driving gear.

3. The rotation angle detection device according to claim 1, further comprising:
   a biasing member that is configured to bias the correction-object driven gear and the correction-exempt driven gear toward the main driving gear.

4. The rotation angle detection device according to claim 1, further comprising:
   a torque sensor configured to detect torque acting on the pinion shaft.

* * * * *